United States Patent [19]
Fujii et al.

[11] Patent Number: 5,402,120
[45] Date of Patent: Mar. 28, 1995

[54] NAVIGATION SYSTEM

[75] Inventors: Takao Fujii, Cupertino, Calif.; Tatsuhiko Abe, Saitama, Japan

[73] Assignee: Zexel Corporation, Tokyo, Japan

[21] Appl. No.: 108,975

[22] Filed: Aug. 18, 1993

[51] Int. Cl.⁶ .................................. G08G 1/123
[52] U.S. Cl. ........................... 340/988; 340/995; 364/449
[58] Field of Search ............... 340/988, 990, 995, 994; 364/444, 449; 73/178 R

[56] References Cited

U.S. PATENT DOCUMENTS

| | | | |
|---|---|---|---|
| 4,782,447 | 11/1988 | Ueno et al. | 340/995 |
| 5,043,902 | 8/1991 | Yokoyama et al. | 340/988 |
| 5,113,185 | 5/1992 | Ichikawa | 340/995 |
| 5,243,529 | 9/1993 | Kashiwazaki | 340/994 |

FOREIGN PATENT DOCUMENTS

| | | | |
|---|---|---|---|
| 0508822 | 10/1992 | European Pat. Off. | |
| 2727311 | 12/1978 | Germany | 340/995 |
| 0093617 | 4/1987 | Japan | 340/995 |
| 0151713 | 7/1987 | Japan | 340/995 |
| 2142143 | 1/1985 | United Kingdom | 340/988 |
| 2260210 | 10/1991 | United Kingdom | 340/988 |

*Primary Examiner*—Brent Swarthout
*Attorney, Agent, or Firm*—Harold L. Burstyn; Thomas R. Morrison

[57] ABSTRACT

A navigation system mounted on a vehicle displays a primary direction indication image on a display unit. This primary direction indication image has a proximal portion that represents a road along which the vehicle is now moving and a direction indication portion that represents a road which the vehicle is to enter at the next intersection. One or more auxiliary direction indication images, with direction indication portions that represent other roads connected to the next intersection, are displayed on the display unit together with the primary direction indication image. The direction indication portion of the auxiliary direction indication image extends from the distal end of the proximal portion of the primary direction indication image.

4 Claims, 8 Drawing Sheets

NAVIGATION SYSTEM

BACKGROUND OF THE INVENTION

The present invention relates to a system mounted on a vehicle to provide in sequence navigation information for primary routes between given starting and destination locations. More particularly, the present invention relates to a vehicle navigation system that displays primary and secondary route information in a quick and convenient way that facilitates vehicle movement between given starting and destination locations.

Vehicle-mounted navigation systems that compute an optimal route from a starting point to a destination and guide the vehicle along the route are known in the prior art. A conventional navigation system provides primary route information to a driver with reference to an approaching intersection. The information shows what direction the vehicle should take, at the approaching intersection, to follow the optimal route to the given destination. Typically, a navigation system predetermines directional symbol's that represent the possible directions of advancement for any given intersection. In use the navigation system displays the symbol that best illustrates the primary route information.

This type of navigation system can cause problems if the angle between roads at an intersection is small. In that case primary route information from the navigational system may not adequately inform the driver which road to enter at the intersection.

A navigational system to overcome this problem is disclosed in Japanese Laid-Open Patent Application No. 61-190698. The system described therein computes the angle between intersecting roads. The roads are then graphically displayed to the vehicle driver at the correct angle, with a symbol showing the direction of vehicle travel superimposed upon the display. With this arrangement, the driver can clearly determine which road to enter. Unfortunately, however, the computational burden to produce the graphical information for this display is substantial, making the processing time excessively long.

Another navigation system of the graphical type is disclosed in Japanese Laid-Open Patent Application No. 62-93617. The system described therein displays a plurality of arrows that correspond to the directions of the roads that the vehicle can enter at the next intersection. The one arrow that corresponds to the direction of the road the vehicle should enter is displayed in color. Unfortunately, drivers using this navigation system can not easily pick out the images of the roads from the plurality of superimposed arrows.

Thus neither of these prior-art systems is satisfactory, and there is room for improvement in vehicle navigation systems with graphical displays.

OBJECTS AND SUMMARY OF THE INVENTION

An object of the present invention is to provide a vehicle navigation system with a graphical display that overcomes the drawbacks of the prior art.

A further object of the present invention is to provide a navigation system in which the direction of a vehicle's advance at an intersection is displayed so that a driver can perceive it easily and rapidly.

Still a further object of the present invention is to provide a navigation system, displaying the direction of a vehicle's advance at an intersection so that a driver can perceive it easily and rapidly, in which the information displayed can be computed in a very brief time.

Briefly stated, the present invention provides a navigation system mounted on a vehicle that displays a primary direction indication image on a display unit. This primary direction indication image has a proximal portion that represents a road along which the vehicle is now moving and a direction indication portion that represents a road which the vehicle is to enter at the next intersection. One or more auxiliary direction indication images, with direction indication portions that represent other roads connected to the next intersection, are displayed on the display unit together with the primary direction indication image. The direction indication portion of the auxiliary direction indication image extends from the distal end of the proximal portion of the primary direction indication image.

According to an embodiment of the invention, a navigation system comprises: a display unit; means for computing from map information an optimal route from a starting point to a destination, the optimal route including a plurality of intersections; the means for computing identifying a one of the intersections as a next intersection; means for storing a plurality of direction indication images; each of the direction indication images having a proximal portion that represents a road leading to the next intersection; each of the direction indication images having further a direction indication portion that extends in a straight line from a distal end of the proximal portion; first means for selecting, from the means for storing, a first direction indication image having a direction indication portion that corresponds to a first road that a vehicle is to enter at the next intersection, the first direction indication image being a primary direction indication image; second means for selecting, from the means for storing, at least one second direction indication image having a direction indication portion that corresponds to at least one other road connected to the next intersection, the at least one second direction indication image being an at least one auxiliary direction indication image; means for locating a present position of the vehicle; means for identifying, cooperating with the means for locating, the means for storing, and the means for computing, to identify the next intersection on the optimal route; means for displaying the primary direction indication image and the at least one auxiliary direction indication image on the display unit; the primary direction indication image and the at least one auxiliary direction indication image being displayed to contrast with each other; the primary direction indication image being displayed in preference to the at least one auxiliary direction indication image; and the at least one auxiliary direction indication image being displayed so that the direction indication portion of the at least one auxiliary direction indication image extends from the distal end.

According to a feature of the invention, a navigation system comprises: a display unit; means for computing from map information an optimal route from a starting point to a destination, the optimal route including a plurality of intersections; the means for computing identifying a one of the intersections as a next intersection; first means for storing a plurality of first direction indication images; each of the first direction indication images having a proximal portion that represents a road leading to the next intersection; each of the first direction indication images having further a direction indication portion that extends in a straight line from a distal end of the proximal portion; second means for storing a plurality of second direction indication images; each of the second direction indication images having a direction indication portion that extends in a straight line; each of the second direction indication images having further a distal end of a direction indication portion different in shape from a distal end of a direction indication portion of the first direction indication images; first means for selecting, from the means for storing, a one of the first direction indication images having a direction indication portion that corresponds to a first road that a vehicle is to enter at the next intersection, the one first direction indication image being a primary direction indication image; second means for selecting, from the means for storing, at least one of the second direction indication images having a direction indication portion that corresponds to another road connected to the next intersection, the at least one second direction indication image being an at least one auxiliary direction indication image; means for locating a present position of the vehicle; means for identifying, cooperating with the means for locating, the means for storing, and the means for computing, to identify the next intersection on the optimal route; and means for displaying the primary direction indication image and the at least one auxiliary direction indication image on the display unit; the primary direction indication image and the at least one auxiliary direction indication image being displayed to contrast with each other; the primary direction indication image being displayed in preference to the at least one auxiliary direction indication image; and the at least one auxiliary direction indication image being displayed so that the direction indication portion of the at least one auxiliary direction indication image extends from the distal end.

According to another feature of the invention, a navigation system comprises: a display unit; means for computing from map information an optimal route from a starting point to a destination, the optimal route including a plurality of intersections; the means for computing identifying a one of the intersections as a next intersection; means for storing a plurality of groups of direction indication patterns each of the groups having a plurality of members; each of the members having a straight proximal portion representing a road leading to the next intersection and a direction indication portion that extends straight from a distal end of the proximal portion; each direction indication portion being spaced a predetermined angle from an adjacent direction indication portion; an integral multiple of the predetermined angle being 360 degrees; at least one member of each group having only a primary direction indication image; other members of each group having other direction indication patterns; each of the other direction indication patterns having the primary direction indication image and an auxiliary direction indication image; the auxiliary direction indication image extending straight from a distal end of the primary direction indication image; the auxiliary direction indication image being displayed to contrast with the primary direction indication image; an angle between the auxiliary direction indication image and the primary direction indication image being equal to the predetermined angle; means for locating a present position of the vehicle; means for identifying, cooperating with the means for locating, the means for storing, and the means for computing, to identify the next intersection on the optimal route; means for selecting the primary direction indication image having the direction indication portion that corresponds to a first road that a vehicle is to enter at the next intersection; means for determining whether there exists an other road represented by the auxiliary direction indication image spaced the predetermined angle from the direction indication portion of the specified primary direction indication image; wherein, if the means for determining finds the other road, the means for selecting selects the member having the auxiliary direction indication image corresponding to the other road and the primary direction indication image corresponding to the first road; and means for displaying causes the member to be displayed on the display unit.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
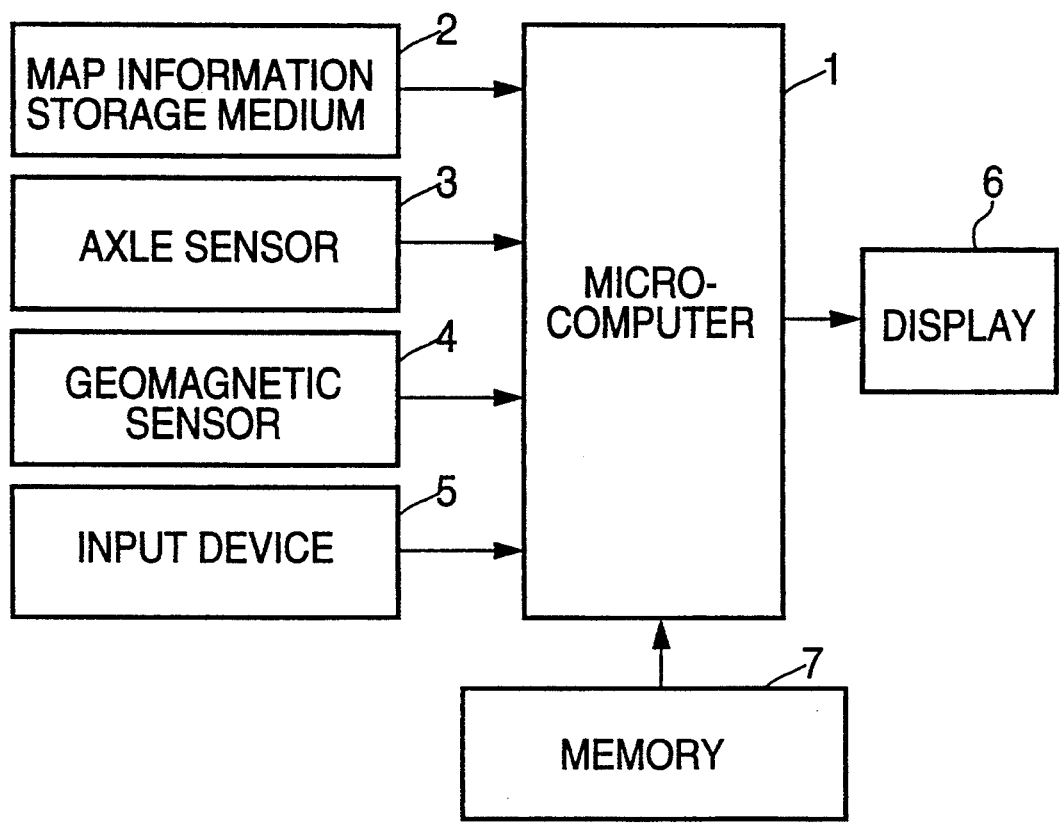
FIG. 1 is a block diagram of a navigation system according to the present invention.

Referring to FIG. 1, a navigation system comprises: a microcomputer 1; a map information storage medium 2 (e.g., a CD-ROM or an IC card) containing map information including intersections and a road network; an axle sensor 3 for feeding pulses to the microcomputer that correspond to the number of revolution of an axle of the vehicle; a geomagnetic sensor 4 for feeding a signal to the microcomputer representing the direction of vehicle travel; an input device 5 for entering a starting point and a destination into the microcomputer; a display 6 for displaying the output information from the microcomputer; and a memory 7 for data storage.

Microcomputer 1 computes a distance of the vehicle's travel from the signal from axle sensor 3. Microcomputer 1 also computes a bearing (azimuth) of the vehicle's travel from the signal from geomagnetic sensor 4. Microcomputer 1 then computes the present position of the vehicle from the starting point, the distance to be traveled, and the direction of travel. In computing the present position, microcomputer 1 may make use of a GPSS (Global Positioning System with Satellite) method with three or four artificial satellites.

Before the vehicle starts, microcomputer 1 also computes an optimal route from a starting point to a destination from stored map information and inputs of a starting point and a destination. The optimal route may be computed to yield either the shortest distance or the shortest time to travel from the starting point to the destination.

Figure 2:
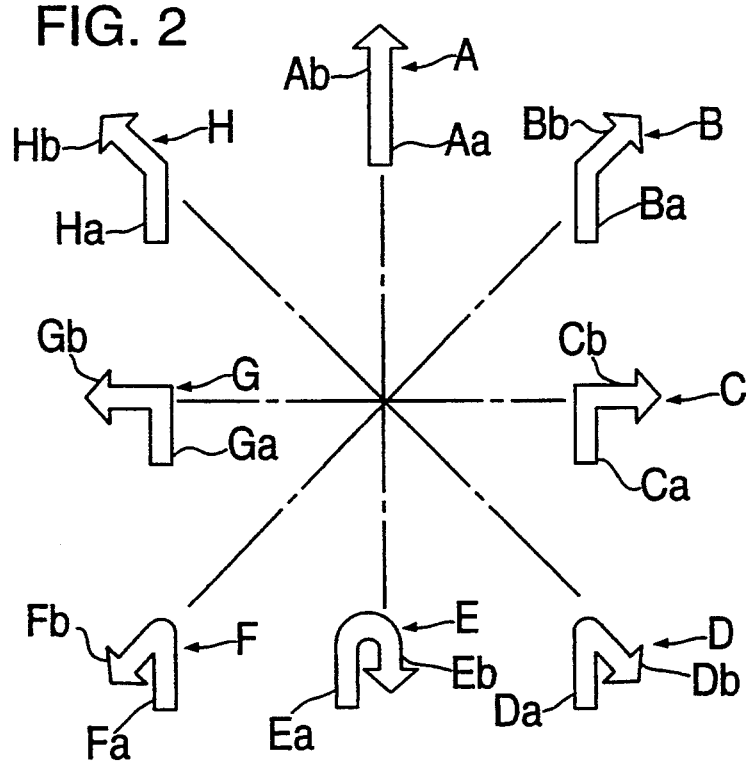
FIG. 2 shows a set of eight arrows stored in a memory.

Referring to FIG. 2, memory 7 contains eight direction indication images in the form of eight arrows A-H. Arrows A-H have each a proximal portion Aa-Ha. Each proximal portion represents a road along which the vehicle is presently traveling. Arrows A-H also each have a distal portion Ab-Hb that represents the direction to which the vehicle must turn at the next intersection to move from the traveled road to the next road on the optimal route. The distal portions of arrows A-H are spaced apart 45° from one another.

From arrows A-H stored in memory 7, microcomputer 1 selects an arrow that corresponds to the direction of the road the vehicle is to enter at the next intersection. This arrow is the primary direction indication image. Under certain circumstances, as noted below, microcomputer 1 may also select another arrow to indicate the direction of another road connected to the intersection. This second arrow is the auxiliary direction indication image, which may be displayed along with the primary direction indication image.

Figure 3A:
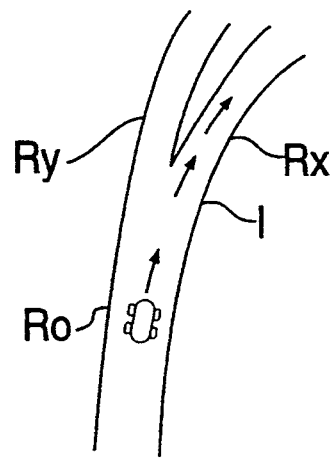
FIG. 3A is a schematic view of actual roads at an intersection.
Figure 3B:
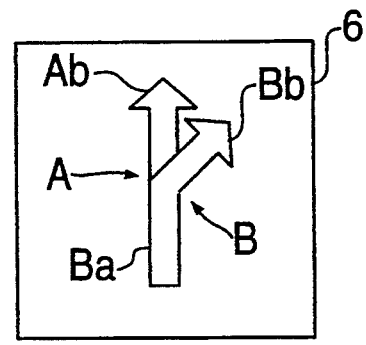
FIG. 3B is a combination arrow as displayed before the vehicle reaches the intersection of FIG. 3A.

Referring to FIGS. 3A and 3B, a vehicle travels along a road $R_o$. As indicated by the arrows, the vehicle is to enter road $R_x$ at a next intersection I, where road $R_o$ divides into a road $R_x$ and a road $R_y$. $R_x$ and $R_y$ separate from each other at a small angle.

In this case microcomputer 1 selects arrow B, corresponding to road $R_x$, as the primary direction indication image, and arrow A, corresponding to road $R_y$, as the auxiliary direction indication image. The distal portions of arrows B and A closely represent the directions of roads $R_x$ and $R_y$. Referring to FIG. 3B, a combination arrow formed by the overlay of primary direction indication arrow B and auxiliary direction indication arrow A is displayed.

Primary direction indication image arrow B is displayed in black. Proximal portion Ba represents road $R_o$; distal portion Bb represents road $R_x$. Auxiliary direction indication image arrow A is displayed differently from primary arrow B. For example, the auxiliary direction indication image may be displayed as an empty outline or in gray.

In the combination image of arrow A overlapping arrow B, proximal portion Aa overlaps proximal portion Ba. However, primary arrow B is more prominently displayed, that is, primary arrow B stands out. Thus only distal portion Ab of auxiliary arrow A can be seen, extending from proximal portion Ba of primary arrow B.

Figure 4A:
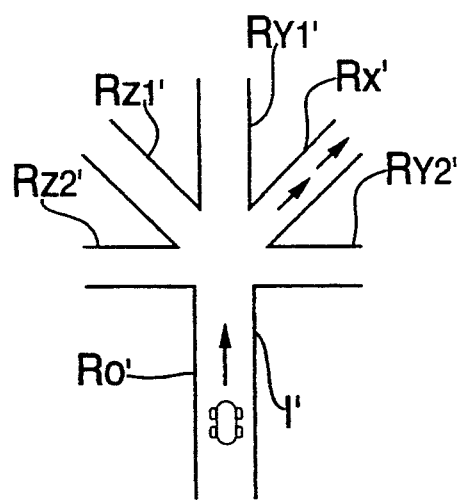
FIG. 4A is a schematic view of actual roads at another intersection.
Figure 4B:
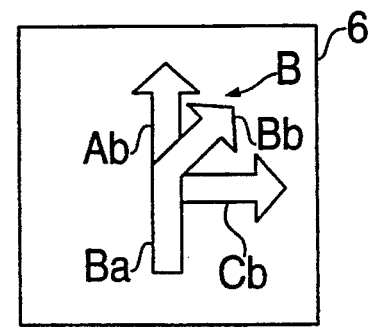
FIG. 4B is a combination arrow as displayed before the vehicle reaches the intersection of FIG. 4A.

Referring to FIG. 4A, the vehicle is travelling along a road $R_o'$, and approaching an intersection I' at which $R_o'$ divides into five roads: $R_x'$, $R_{y1}'$, $R_{y2}'$, $R_{z1}'$, and $R_{z2}'$. The optimal route calls for the vehicle to enter road $R_x'$. In this case arrow B is selected as the primary arrow and arrows A and C as auxiliary arrows. The combination arrow thus formed is shown in FIG. 4B. Proximal portion Ba and distal portion Bb of primary arrow B are both shown on display 6 in black. Only distal portions Ab and Cb of auxiliary arrows A and C, representing respectively roads $R_{y1}'$ and $R_{y2}'$, extend from proximal portion Ba of the primary arrow B. Distal portions Ab and Cb are displayed differently from primary arrow B, for example, as an empty outline or a gray image.

Since roads $R_{y1}'$ and $R_{y2}'$ intersect road $R_x'$ at a small angle, either may be easily confused with road $R_x'$. Thus the arrows corresponding to roads $R_{y1}'$ and $R_{y2}'$ are selected as auxiliary arrows and shown on display 6. Since roads $R_{z1}'$ and $R_{z2}'$ intersect road $R_x'$ at a large angle, they are not easily confused with road $R_x'$. Thus the arrows corresponding to roads $R_{z1}'$ and $R_{z2}'$ are not selected as auxiliary arrows, and they are not displayed. Using this criterion—ease of confusion—to exclude auxiliary direction indicators prevents a combination arrow from becoming too complicated.

As described above, the primary arrow and the auxiliary arrow(s) are selected from arrows A to H prestored in memory 7. Therefore the time to compute and display the combination arrow is shorter with this method than with a method in which all roads connected to an intersection are displayed. Further, since the combination arrow is displayed so that the proximal portion of each auxiliary arrow is superimposed on the proximal portion of the primary arrow, the driver can easily interpret an image of the roads at the coming intersection. Therefore the driver easily chooses the correct road for the vehicle to enter.

Figure 5:
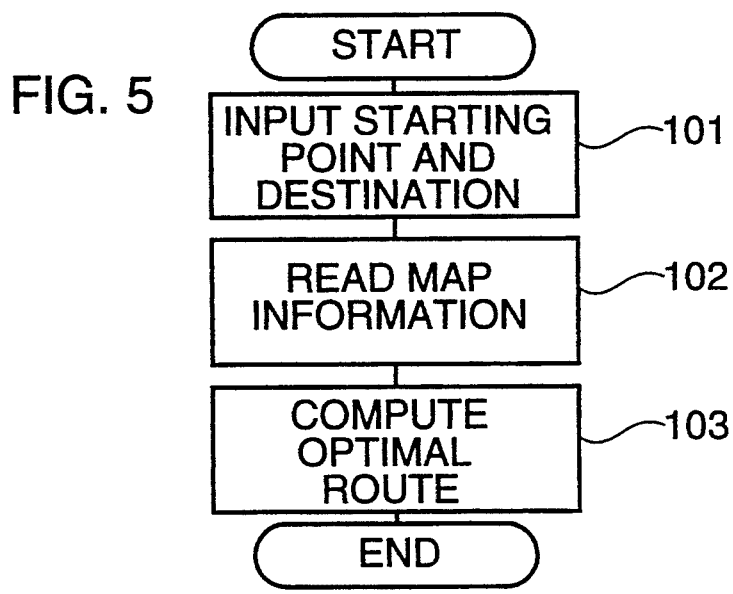
FIG. 5 is a flow chart of a routine for computing an optimal route, to be executed by a microcomputer.

Referring to FIG. 5, microcomputer 1 executes a series of steps to compute the optimal route to a destination. This series or routine begins when the driver turns On either an ignition key switch or a starting switch of the navigation system. The driver then enters a starting point and a destination (Step 101). Stored map information is read into microcomputer 1 from map information storage medium 2 (Step 102). Microcomputer 1 selects an optimal route from the starting point to the destination from the map information (Step 103).

Figure 6:
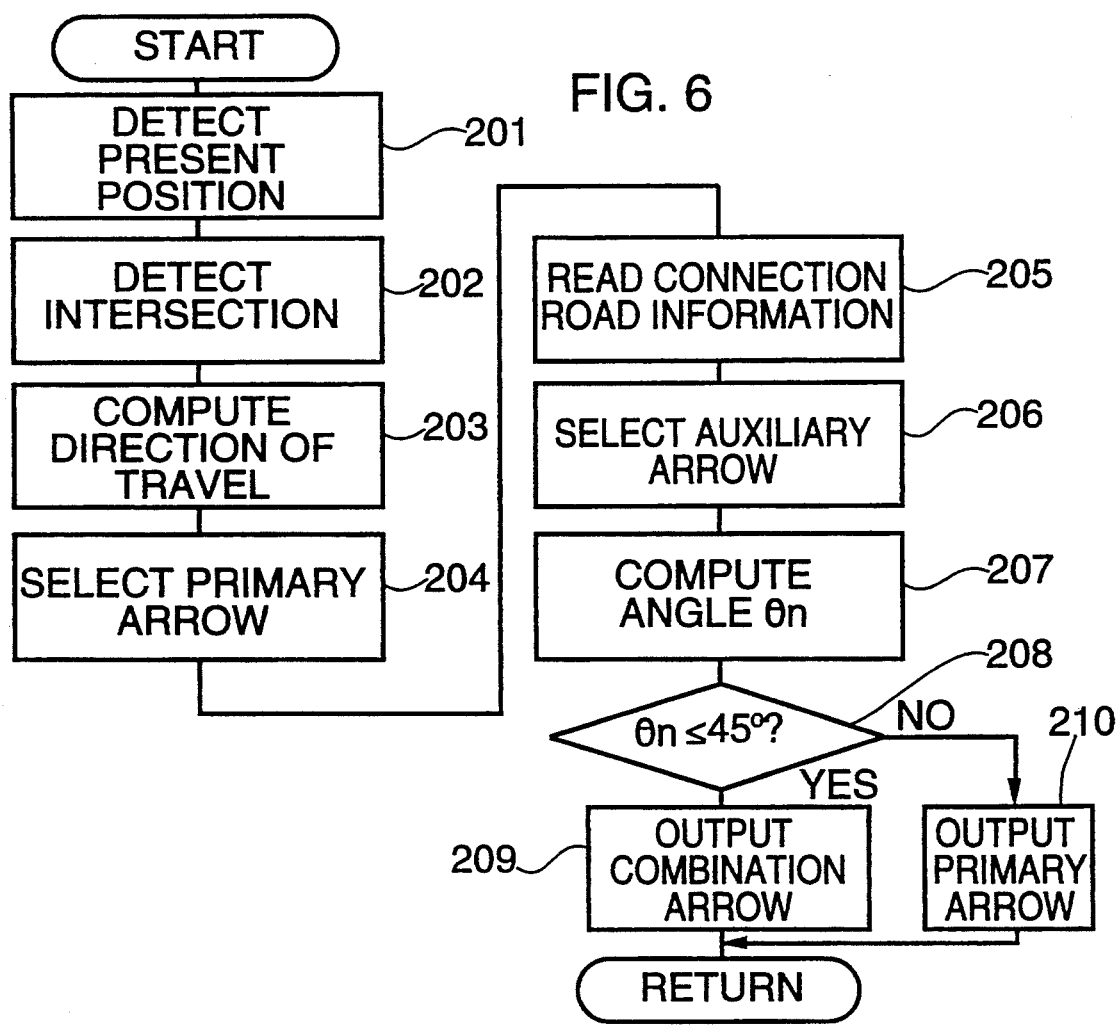
FIG. 6 is a flow chart of a timer-interrupt routine to be executed by the microcomputer.

Referring to FIG. 6, microcomputer 1 also executes a timer-interrupt routine at predetermined time intervals. The present position of the vehicle is located (Step 201). The next intersection is determined (Step 202) from the present position information (determined in Step 201)

and the optimal route information (calculated in Steps 101–103). The direction the vehicle should take from the next intersection is computed from the optimal route information and the information about the next intersection (Step 203). The arrow closest to the combination of the present direction of travel and the direction from the next intersection is selected as the primary direction indication arrow (Step 204).

Details of any other roads connected to the next intersection are read into microcomputer 1 from map information storage medium 2 (Step 205). The one or more auxiliary arrows closest to the other road or roads are selected from prestored arrows A to H (Step 206).

If the primary arrow selected in Step 204 is one of arrows D, E, and F, an auxiliary arrow is not selected in Step 206. If one or more auxiliary arrows are selected in step 206, the angle between the primary arrow and the auxiliary arrow is computed (Step 207). Then a decision is made whether or not there is a road from the next intersection whose angle Hn to the present direction of travel is not more than 45° (Step 208). If the decision is "YES", an auxiliary arrow or arrows are selected and combined with the primary arrow to form a combination arrow (Step 209). If the decision in Step 208 is "NO", only the primary arrow is shown on display 6.

Figure 7:
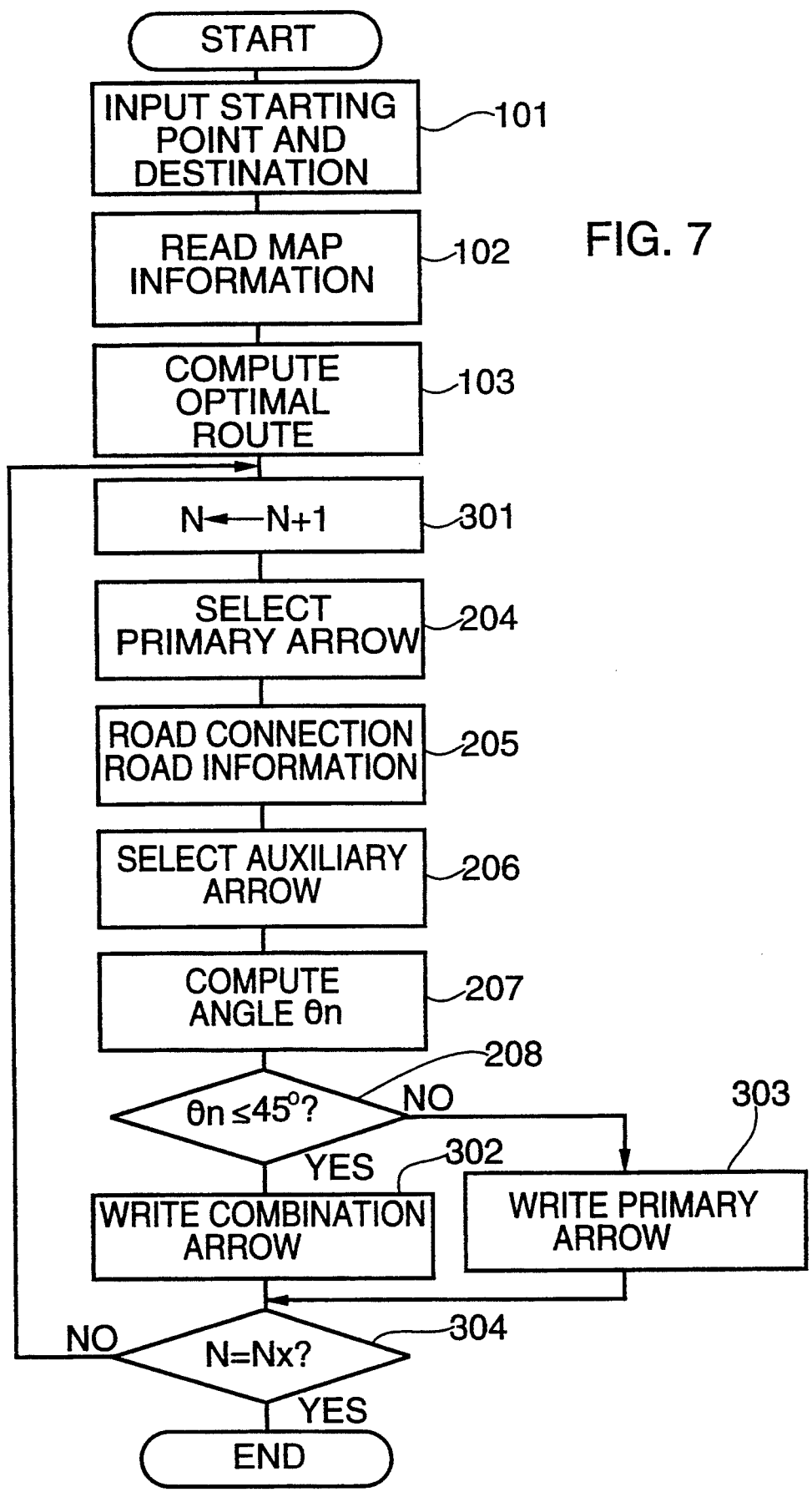
FIG. 7 is a flow chart of a modified routine to be executed by the microcomputer.
Figure 8:
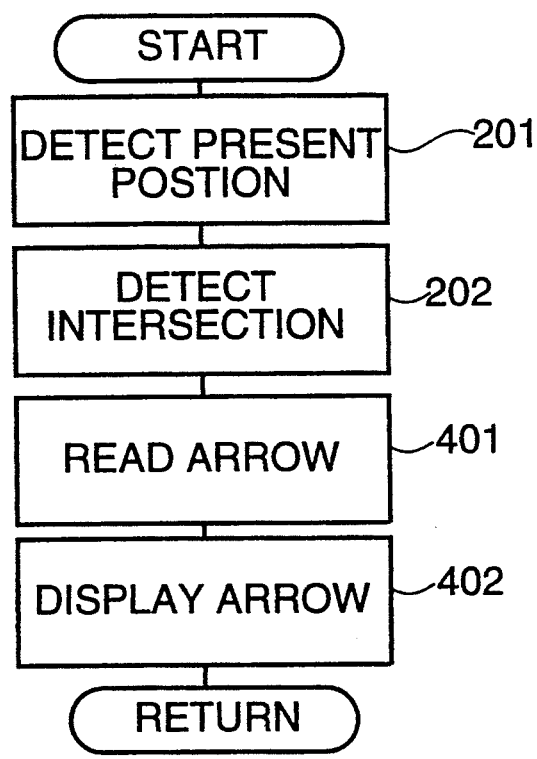
FIG. 8 is a flow chart of a timer interrupt routine to be executed by the microcomputer following the execution of the routine of FIG. 7.

Referring to FIGS. 7 and 8, in a second embodiment of the present invention, microcomputer 1 executes routines that contain some steps already shown in FIGS. 4 and 5. Those steps are designated in FIGS. 7 and 8 by identical reference numerals, and detailed explanations are omitted.

Referring to FIG. 7, as in the first preferred embodiment, the routine begins when the driver turns on either the ignition key switch or the starting switch of the navigation system. When the optimal route is computed (Step 103), the program increments a counter N that represents the address of intersections on the optimal route extending from the starting point to the destination (Step 301). At the initial cycle of the program, the initial value of counter N (=0) is incremented, thereby assigning "1" to the first intersection the vehicle is to pass through.

After Step 301, the routine of FIG. 7 proceeds to Steps 204–208 previously described with reference to FIG. 6. If the decision in Step 208 is "YES", a combination arrow is written into a memory area that corresponds to the address pointed to by counter N (Step 302). If the decision in Step 208 is "NO", only the primary arrow is written into the memory area corresponding to the address (Step 303).

The value of N is then compared with Nx, where Nx represents the address of the last intersection on the optimal route (Step 304). Until N coincides with Nx, Steps 204–208 and 302–304 are repeated. When N reaches Nx, the program ends by exiting from the loop.

In this second embodiment of the invention, microcomputer 1 also executes the timer-interrupt routine shown in FIG. 8. After Steps 201 and 202 are executed, the r primary or combination arrow for the address that corresponds to the detected intersection is read from memory 7 (Step 401). The arrow read from memory 7 is then shown on display 6 (Step 402). After displaying the arrow, the routine ends.

Figure 9:
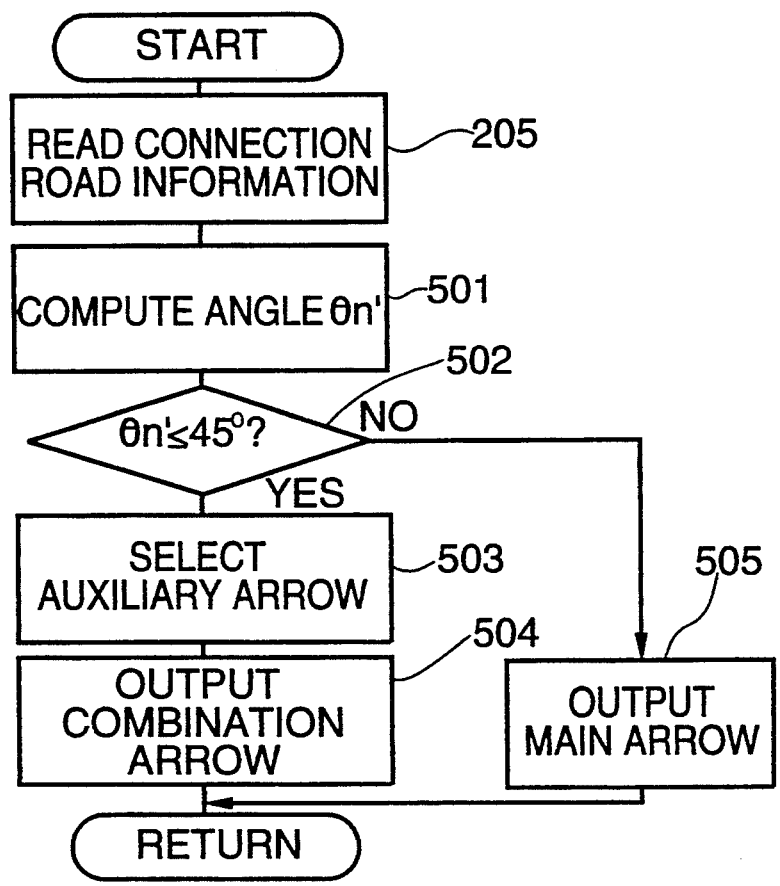
FIG. 9 is a flow chart of a portion of a modified timer-interrupt routine to be executed by the microcomputer.

Referring to FIG. 9, a third embodiment of the present invention starts with Step 205. The subsequent steps of the routine shown in FIG. 9, Steps 501–505, correspond to Steps 206–210 in FIG. 6. After details of any other roads connected to the next intersection are read into microcomputer 1 from map information storage medium 2 (Step 205), the value of an angle θn is computed from information in map information storage medium 2 (Step 501). θn' is the angle between a road on the optimal route, along which the vehicle is to travel beginning at the next intersection, and another road at that intersection. Then it is decided whether or not there is another road that makes an angle of 45° or less with the road the vehicle is to travel on next (Step 502). That is, is θn' less than or equal to 45°? If the decision is "YES", i.e., θn'<45°, the auxiliary arrow corresponding to the other road is selected from arrows A–H (Step 503). Then this auxiliary arrow is combined with the primary arrow to form a combination arrow shown on display 6 (Step 504). If the decision in Step 502 is "NO", i.e., θn'>45°, only the primary arrow is displayed (Step 505). The routine ends with the execution of either Step 504 or 505.

Referring to FIGS. 3A, 4A, 10A, 10B, and 10C, in a fourth embodiment of the present invention, memory 7 stores direction indication images A'–H' (FIG. 10A) in addition to arrows A–H (FIG. 2). Direction indication images A'–H' correspond respectively to arrows A–H. Direction indication images A'–H' are similar to arrows A–H by having proximal portions and direction indication portions respectively. The proximal portions are Aa'–Ha'. The direction indication portions are Ab'–Hb.' The direction indication portions Ab'–Hb' are bar-shaped rather than arrow-shaped.

Referring to FIG. 3A, as the vehicle travels along road $R_o$, arrow B corresponding to road $R_x$ is selected as the primary arrow or direction indication image, as described above for the first three embodiments, and direction indication image A' corresponding to road $R_y$ is selected as the auxiliary direction indication image.

Figure 10A:
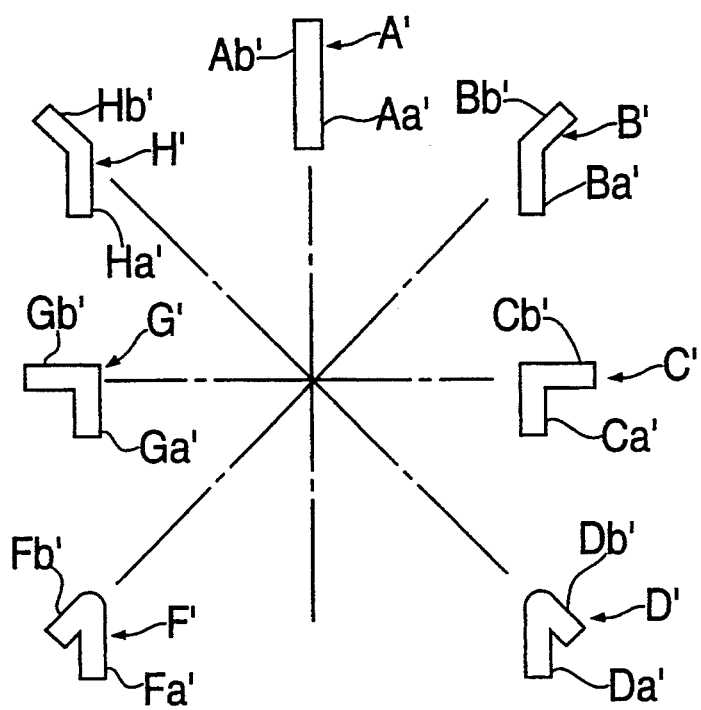
FIG. 10A is a set of direction indication images stored for use as modified auxiliary direction indication images.
Figure 10B:
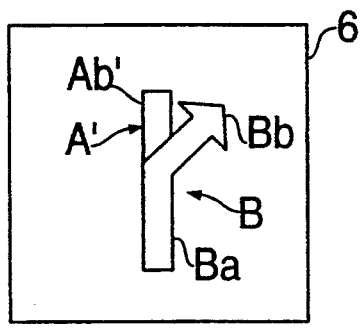
FIG. 10B is a combination direction indication image that corresponds to the road of FIG. 3A and uses the direction indication image of FIG. 10A.
Figure 10C:
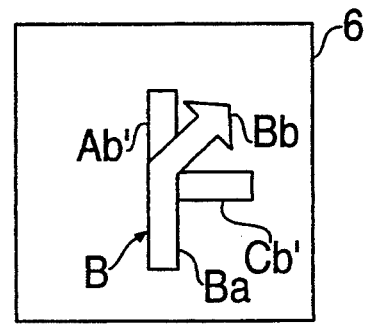
FIG. 10C is a combination direction indication image that corresponds to the road of FIG. 4A and uses the direction indication images of FIG. 10A.

Referring to FIG. 10B, primary arrow B and auxiliary direction indication image A' are then combined into an image, and this combination image is displayed on the screen of display 6. Similarly, referring to the road shown in FIG. 4A, a combination image as in FIG. 10C is displayed on the screen of the display 6. This method of combining images is the same as in the first embodiment.

Referring to FIGS. 3A, 4A, 11A, 11B, and 11C, in a fifth embodiment of the present invention, memory 7 (FIG. 1 ) stores direction indication images A" to H" (FIG. 11A) in addition to arrows A to H (FIG. 2). Direction indication images A" to H" do not have proximal portions, only direction indication portions.

Referring to FIG. 3A, as the vehicle travels along road $R_o$, arrow B corresponding to road $R_x$ is selected as the primary arrow or direction indication image, as described for the above embodiments, and direction indication image A" corresponding to road $R_y$ is selected as an auxiliary direction indication image.

Figure 11A:
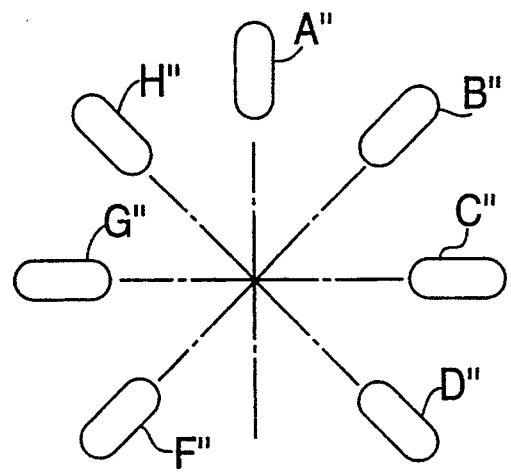
FIG. 11A is a set of direction indication images stored for use as another set of modified auxiliary direction indication images.
Figure 11B:
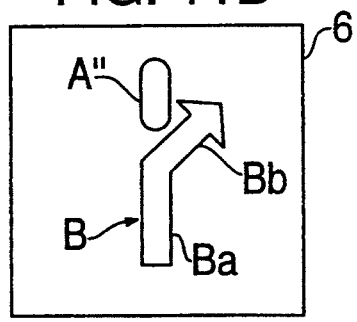
FIG. 11B is a combination direction indication image that corresponds to the road of FIG. 3A and uses the direction indication images of FIG. 11A.
Figure 11C:
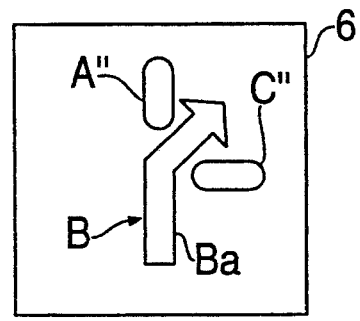
FIG. 11C is a combination direction indication image that corresponds to the road of FIG. 4A and uses the direction indication images of FIG. 11A.
Figure 12A:
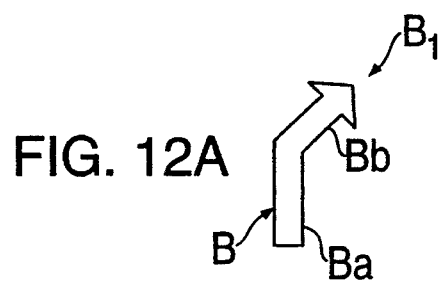
FIGS. 12(a)–12(d) are a group of direction indication patterns prestored in a memory in a further embodiment of the invention.
Figure 12B:
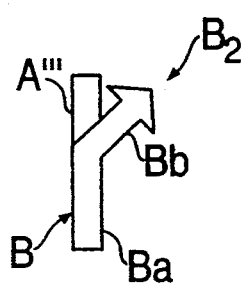
Figure 12C:
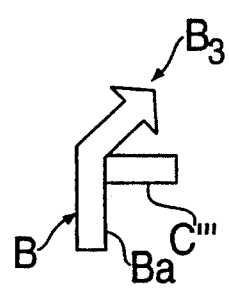
Figure 12D:
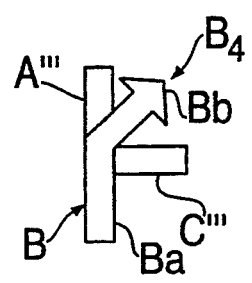

Referring to FIG. 11B, primary arrow B and auxiliary direction indication image A" are then combined into an image, and this combination image is displayed on the screen of display 6. As shown, auxiliary direction indication image A" is separate from primary arrow B. Similarly, referring to FIG. 4A, a combination image as in FIG. 11C is displayed on the screen of display 6.

The programs flowcharted in FIGS. 5 to 9 apply to all embodiments in which both primary arrows and auxiliary direction indication images are stored in memory 7.

Referring to FIGS. 12(a)–12(d), in a sixth embodiment of the present invention, memory 7 (FIG. 1) stores eight groups of direction indication patterns. Each of the eight groups includes a primary arrow A-H (FIG. 2) displayed in black. Three of the eight groups include only primary arrows D-F. Each of the other five groups includes one of the arrows A, B, C, G, and H displayed in black, and three other direction indication patterns. For example, the one group in FIG. 12 includes four direction indication patterns: $B_1$, $B_2$, $B_3$, and $B_4$. Direction indication pattern $B_1$ is only the primary arrow B (FIG. 12(a)). Direction indication pattern $B_2$ (FIG. 12(b)) has an auxiliary direction indication image A''' in addition to primary arrow B. Auxiliary direction indication image A''' extends from proximal portion Ba of primary arrow B and is spaced 45° counterclockwise from direction indication portion Bb. Direction indication pattern $B_3$ (FIG. 12(c)) includes an auxiliary direction indication image C''' spaced 45° clockwise from direction indication portion Bb. Direction indication pattern $B_4$ (FIG. 12(d)) includes both auxiliary direction indication images A''' and C'''.

Figure 13:
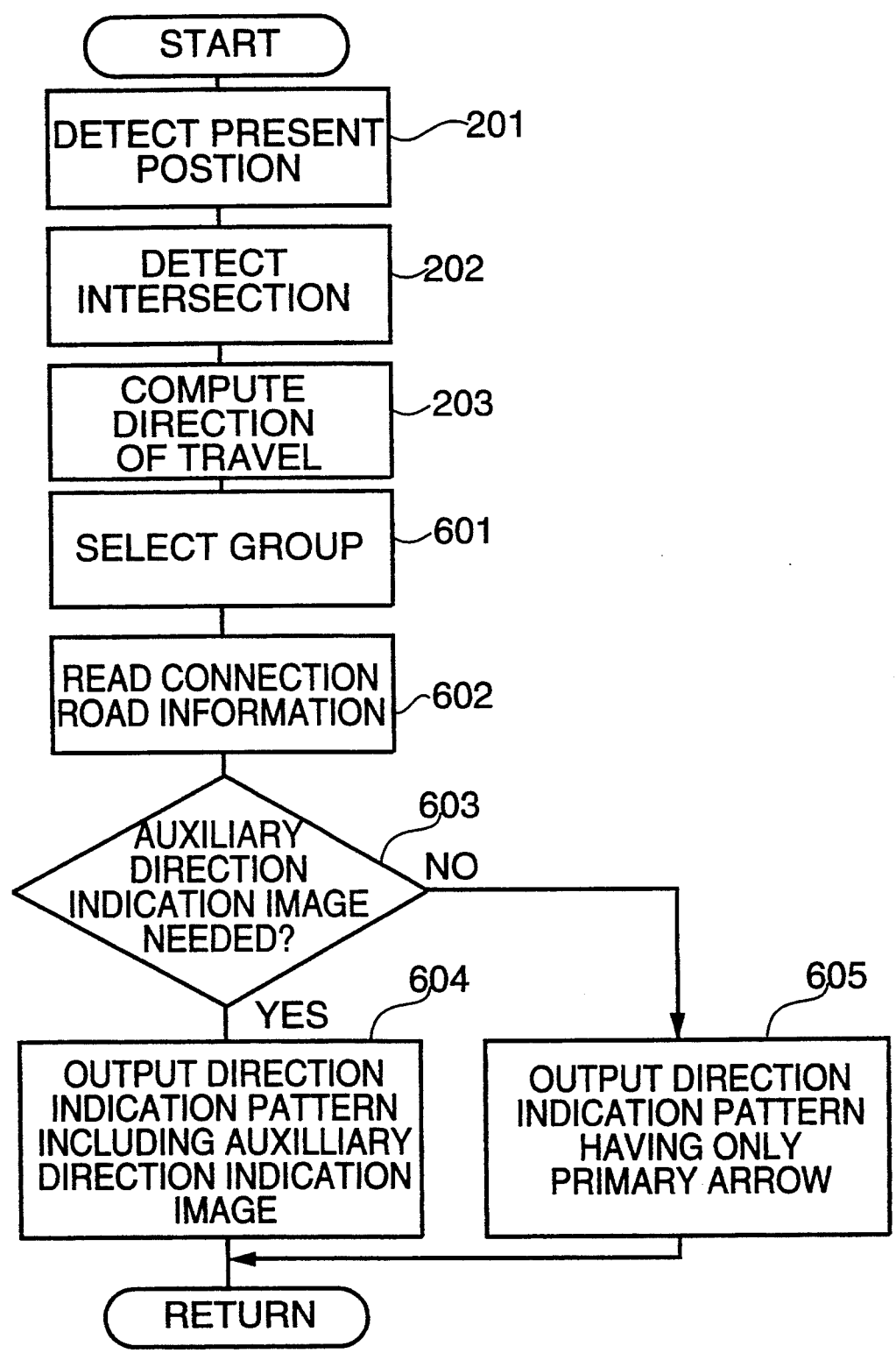
FIG. 13 is a flow chart of a timer-interrupt routine executed by the microcomputer to use the direction indication patterns of FIG. 12.

Referring to FIG. 13, when the present invention uses the direction indication patterns of FIGS. 12(a)-12(d), microcomputer 1 executes a routine different from the routine of FIG. 6. The new routine begins by determining the direction of the vehicle's travel (Step 203). Then microcomputer 1 selects that group of direction indication patterns to which belongs the primary arrow that represents the direction of travel (Step 601). Then any road connected to the next intersection is read in (Step 602). Next it is decided whether or not there is a road to be displayed by an auxiliary direction indication image spaced 45° from the primary arrow (Step 603). If this decision is "YES", the direction indication pattern, with the corresponding auxiliary direction indication image, is selected from the group and displayed (Step 604). In contrast, if the decision in Step 603 is "NO", the direction indication pattern that has only a primary arrow is selected and displayed (Step 605). When the selected group has only a primary arrow, i.e., is D, E, or F, the decision in Step 603 is always negative.

The present invention is not limited to the above embodiments, and various modifications can be made. For example, the direction indication images may be spaced an angle of 22.5° from one another to indicate 16 directions. The primary arrow may be displayed in red while the auxiliary direction indication images are in green, etc.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system comprising:
   a display unit;
   means for computing from map information an optimal route from a starting point to a destination, the optimal route including a plurality of intersections;
   said means for computing identifying a one of said intersections as a next intersection;
   means for storing a plurality of direction indication images;
   each of said direction indication images having a proximal portion that represents a road leading to said next intersection;
   each of said direction indication images having further a direction indication portion that extends in a straight line from a distal end of said proximal portion;
   first means for selecting from said means for storing, a first direction indication image having a direction indication portion that corresponds to a first road that a vehicle is to enter at said next intersection, said first direction indication image being a primary direction indication image;
   second means for selecting from said means for storing, at least one second direction indication image having a direction indication portion that corresponds to at least one other road connected to said next intersection, said at least one second direction indication image being an at least one auxiliary direction indication image;
   means for locating a present position of said vehicle;
   means for identifying, cooperating with said means for locating, said means for storing, and said means for computing, to identify said next intersection on said optimal route;
   means for displaying said primary direction indication image and said at least one auxiliary direction indication image on said display unit;
   said primary direction indication image and said at least one auxiliary direction indication image being displayed to contrast with each other;
   said primary direction indication image being more prominently displayed than said at least one auxiliary direction indication image;
   said at least one auxiliary direction indication image being displayed so that said direction indication portion of said at least one auxiliary direction indication image extends from said distal end;
   said second means for selecting choosing, from a plurality of auxiliary direction indication images each having a direction indication portion that corresponds to said at least one other road, only those auxiliary direction indication images that are spaced from said primary direction indication image at an angle not greater than a specified angle;
   a plurality of direction indication portions of said auxiliary direction indication images indicating directions circumferentially spaced a predetermined angle from one another, an integer multiple of said predetermined angle being 360 degrees; and
   said second means for selecting selecting only auxiliary direction indication images each spaced said predetermined angle from said primary direction indication image.

2. A navigation system according to claim 1, wherein said predetermined angle is 45 degrees.

3. A navigation system comprising:
   a display unit;
   means for computing from map information an optimal route from a starting point to a destination, said optimal route including a plurality of intersections;
   said means for computing identifying a one of said intersections as a next intersection;
   means for storing a plurality of groups of direction indication patterns;
   each of said groups having a plurality of members;
   each of said members having a straight proximal portion representing a road leading to said next intersection and a direction indication portion that extends straight from a distal end of said proximal portion;

said direction indication portion of a one of said members being spaced a predetermined angle from said direction indication portion of an adjacent one of said members;

an integer multiple of said predetermined angle being 360 degrees;

at least one member of each group having only a primary direction indication image;

other members of each group having other direction indication patterns;

each of said other direction indication patterns having said primary direction indication image and an auxiliary direction indication image;

said auxiliary direction indication image extending straight from a distal end of said primary direction indication image;

said auxiliary direction indication image being displayed to contrast with said primary direction indication image;

an angle between said auxiliary direction indication image and said primary direction indication image being equal to said predetermined angle;

means for locating a present position of said vehicle;

means for identifying, cooperating with said means for locating, said means for storing, and said means for computing, to identify said next intersection on said optimal route;

means for selecting said primary direction indication image having said direction indication portion that corresponds to a first road that a vehicle is to enter at said next intersection;

means for determining whether there exists an other road represented by said auxiliary direction indication image spaced said predetermined angle from said direction indication portion of said specified primary direction indication image;

wherein, if said means for determining finds said other road, said means for selecting selects said member having said auxiliary direction indication image corresponding to said other road and said primary direction indication image corresponding to said first road; and means for displaying causes said member to be displayed on said display unit.

4. A navigation system according to claim 3, wherein:

if said means for determining does not find said other road, said means for selecting selects said at least one member having only said primary direction indication image corresponding to said first road; and means for displaying causes said at least one member to be displayed on said display unit.

* * * * *